June 24, 1969   N. N. FRUKTAW   3,451,625

NOZZLE CONFIGURATIONS AND METALLIC SEAL DESIGN

Filed Aug. 11, 1966   Sheet 1 of 7

INVENTOR.
NICHOLAS N. FRUKTAW
BY Harry A. Herbert Jr.
and
ATTORNEYS

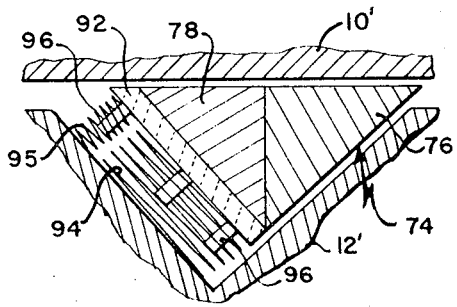
FIG. 4-A
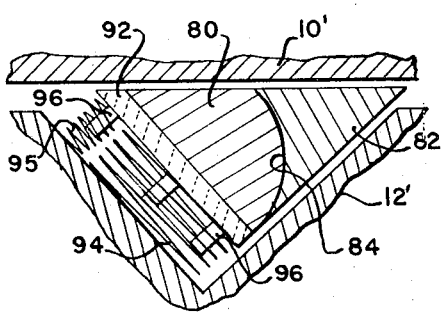
FIG. 4-B
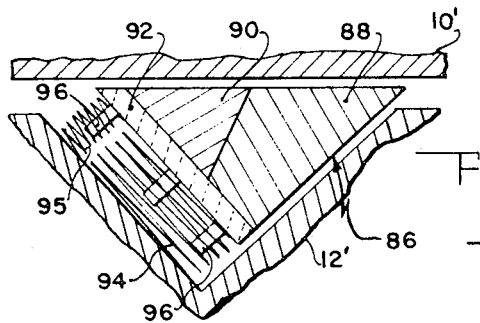
FIG. 4-C
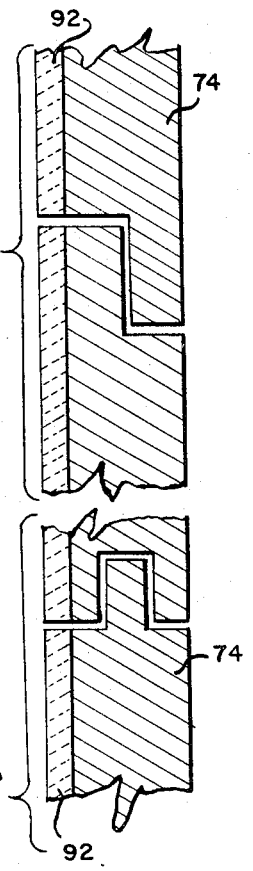
FIG. 4-E
FIG. 4-F
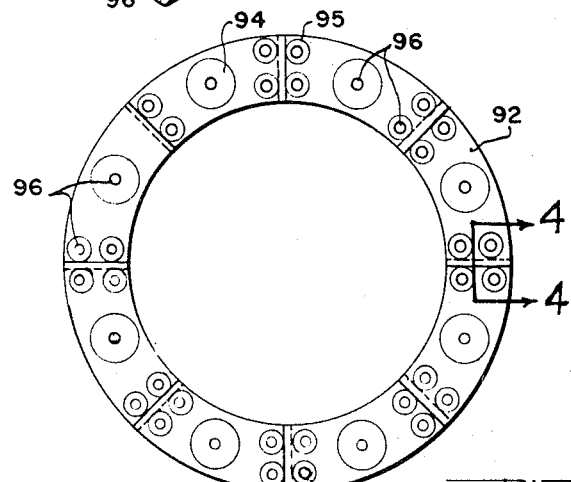
FIG. 4-D

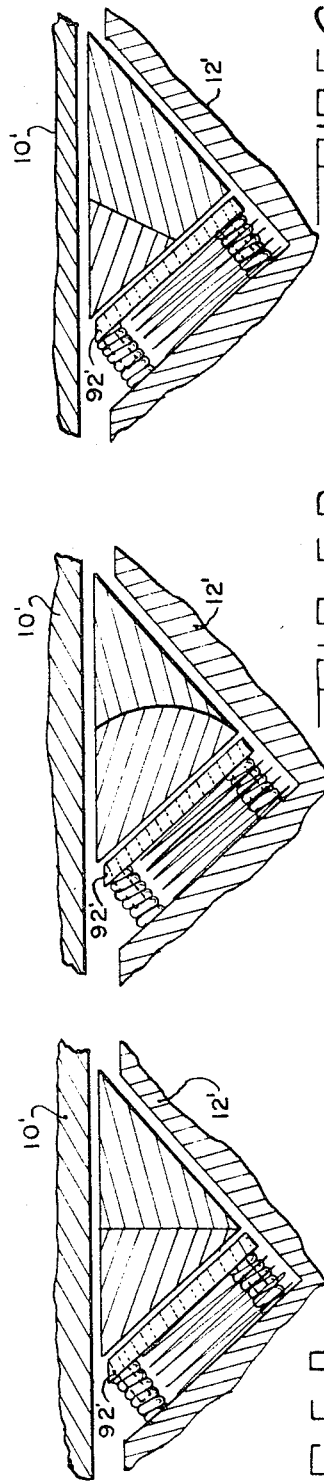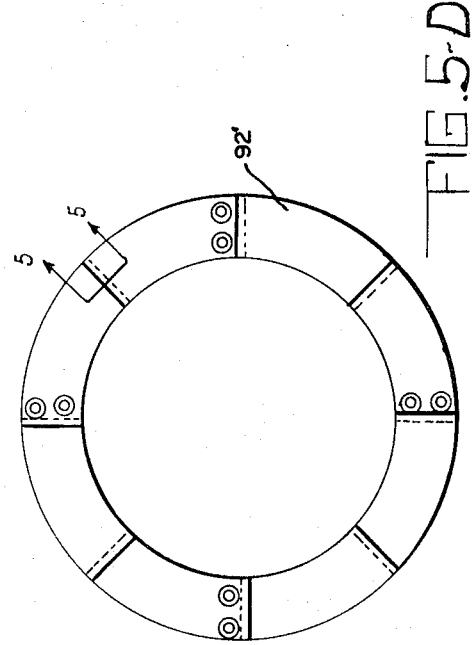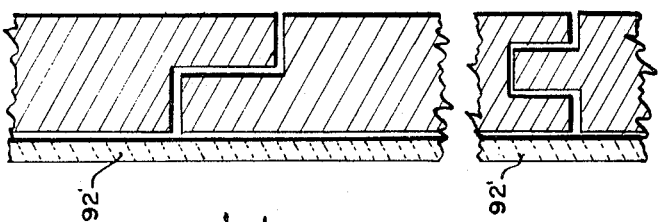

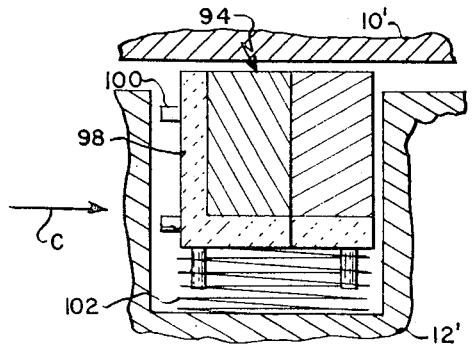
FIG. 6-A
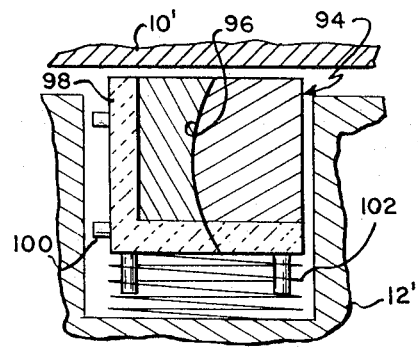
FIG. 6-B
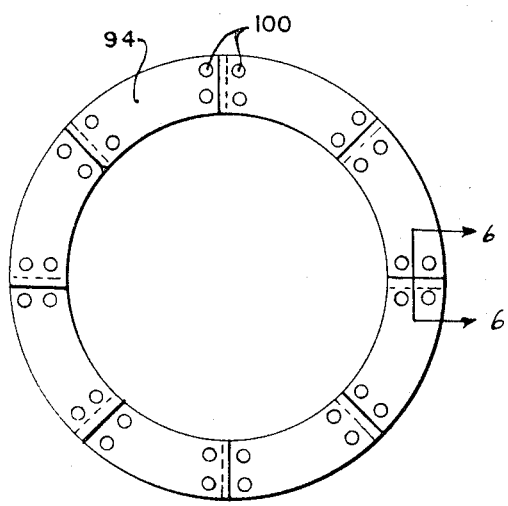
FIG. 6C
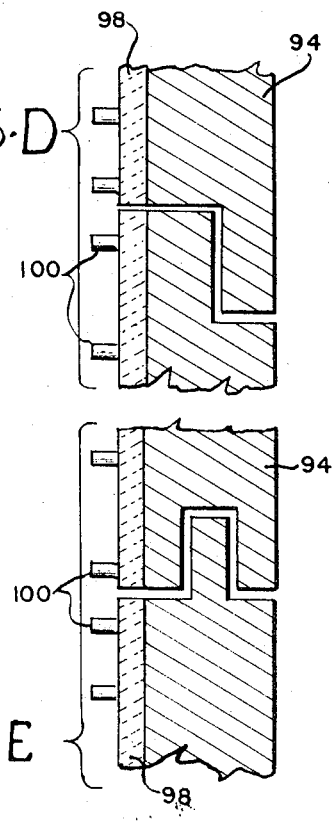
FIG. 6-D
FIG. 6-E

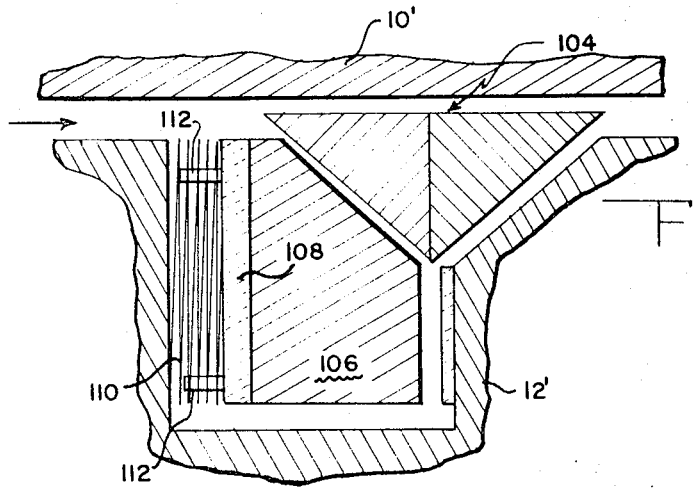
FIG. 7
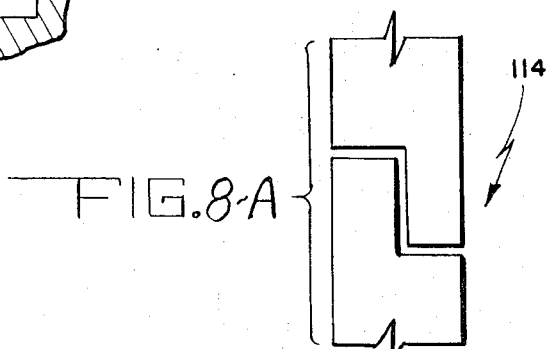
FIG. 8-A
FIG. 8-B
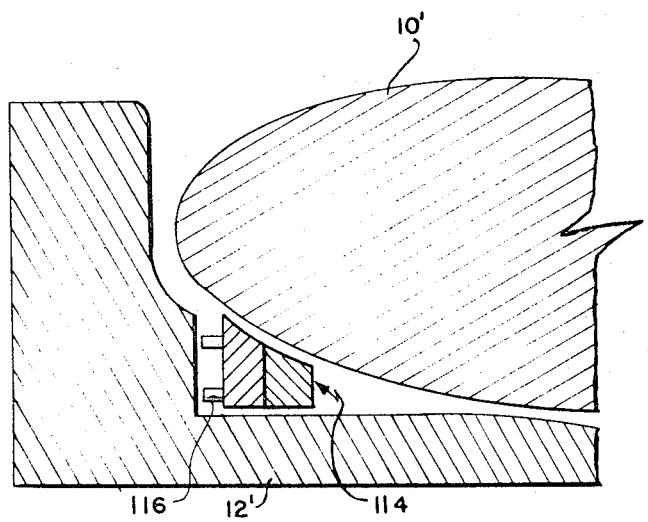
FIG. 8
INVENTOR.
NICHOLAS N. FRUKTAW
BY Harry A. Herbert Jr
and
ATTORNEYS 3,451,625
NOZZLE CONFIGURATIONS AND METALLIC
SEAL DESIGN
Nicholas N. Fruktaw, Hollywood, Calif., assignor to the
United States of America as represented by the Secretary of the Air Force
Filed Aug. 11, 1966, Ser. No. 572,173
Int. Cl. B64c 15/08; F16l 27/06
U.S. Cl. 239—265.35                                      8 Claims

ABSTRACT OF THE DISCLOSURE

Spring biased sealing means placed between a fixed socket and a movable nozzle. Various configurations and patterns of segmentation of these sealing rings are disclosed. Pockets are provided in facing surfaces of fixed and movable members for trapping metallic molten material. A bag of lubricant is located in a recess. The bag is of such material as to be ruptured at predetermined conditions of heat and pressure.

---

The present invention relates to configurations for solid propellant nozzles and metallic seals for these nozzles, and more particularly, nozzle configurations and seals for swivel ball and fixed socket type solid propellant nozzle assemblies.

In the solid propellant nozzles presently available, the ball nozzle is mounted to swivel in one plane in a fixed socket. The high temperature gases, originating in the combustion chamber and traveing downstream, penetrate the split line gap between the swiveled nozzle and the fixed socket. These traveling hot gases contain aluminum oxide, tungsten molybdenum alloy, and possibly other vaporized and molten metals which deposit on the relatively cold metal surfaces upon contact, causing deterioration of the seal and increasing friction.

The ball and socket assembly is now usually sealed by an elastomeric A or Bunan O ring.

To protect the elastomeric O-ring from high thermal shocks, the split gap between the moving parts is kept as small as possible. It is kept at a base minimum for the additional reason of protecting the upstream sections of the nozzle. This close tolerance engenders erratic friction between the sliding surfaces of the nozzle. The split line clearance is so small that during the nozzle firing, the material of the elements along the gap are very liable to expand erratically, causing high frictional torque upon contact. The elastomeric seals now available deteriorate under high temperature conditions. They deteriorate also when stored and thus replacement becomes frequently necessary.

The life of the elastomeric seal is always short and is unpredictable. Failure is catastrophic and replacement is expensive.

The present invention seeks to overcome these difficulties by providing socket and nozzle contours which deter entrance of gasses into the gap and further to provide grooves or pockets which entrap the metallic content of such gasses as do enter. One of the ways in which this is done is to provide an annular shoulder on either the socket or the nozzle extending over the gap opening. This not only prevents gasses with their molten metallic content from entering the gap, but also improves the flow characteristics of gas flow through the nozzle. Grooves forming annular pockets are also formed in the facing surfaces of socket and nozzle which act as filters for entrapping lubricants and metallic deposits. Lubricants may also be contained in frangible envelopes which burst to release the lubricant under heat and pressure conditions of operation. A further varied configuration of the socket and nozzle makes use of a large annular substantially V-shaped recess in the fixed socket, into which the socket fits, forming a reverse turn gap.

Another important feature of the invention is the provision of metallic sealing rings where elastomers were formerly used. These rings may be triangular in cross section and may be split into two or more ring segments of a variety of nested configurations. They may be of split rectangle, or of split trapezoidal configurations, may mate along straight or curved surfaces, may be split into arcuate sections and may mesh by tongue and groove or offset shoulder. Examples given are exemplary only. Cavities are formed in the socket to receive these seals, and they are so placed that the pressure of the gasses entering the groove or gap reinforces the seal.

The segmentation of the sealing ring has the advantage, not only of accommodating expansion but also of providing effective scrapers to keep facing gap surfaces free of deposit.

The invention also provides retaining devices to hold the ring segments in place. These take the form of insulating and retaining rings formed to fit the contour of the seal, and of retaining springs whose bias augments the gas flow pressure, and of pins arranged along the outwardly directed surface or surfaces of retaining rings to function when springs relax or fail.

The seal of the invention is applicable to many different types of joints where there are relatively moving elements, not only of the ball and socket type, but also piston and cylinder devices as well, and further in environments where the elastomeric seal will not sustain the extreme high temperatures, pressures and shock loads. For example, the seal of the invention can be used in cartridge actuated aircraft armament release mechanisms, where instant hot gas pressures up to 40,000 p.s.i. are prevalent and elastomers would vaporize.

In many instances recocking of pistons is interferred with by abrasive carbon deposit present in a cylinder bore of the actuating mechanism. One function served by the triangular metallic seal, and particularly the split triangle is, that as noted above, the elements become effective scrapers for removing metallic deposits in the cylinder bore.

To summarize the uses and unique characteristics of the seal of the present invention: a seal is provided which is usable on movable joints involving fixed socket and swivel ball, on sliding or rotating piston assemblies, actuating devices subjected to severe temperatures, and pressures and other severe environmental conditions. The seal devices require a minimum of maintenance, are long lived and do not require replacement. They can be used wherever O-rings are used and in situations where deterioration cannot be tolerated. They are all metal; they are highly versatile. One concept solves many dynamic applications. The seal is light in weight, usable with a wide range of materials and is self-maintaining. It is weatherproof, salt-spray proof, fire resistant. It is resistant to radiation, both nuclear and solar. It is indifferent to temperature variations during conditions of both storage and operation. It does not bind or gap during temperature changes. It is self-polishing, does not deteriorate, but rather improves with use. There is no breakdown of elastomeric compounds. Parts are interchangeable and easy to install. With pressure decay, high frictional torques are eliminated by variable torque diminishing.

It can be made any size, many materials can be used, for example, stainless steel, Inconel "X," tantalum, tungsten. The seal can be used with many types and surface material as tungsten carbine, tungsten cobalt, chrome and many others, where wear resistance is required.

In the drawings:

FIGS. 4A, 4B and 4C are fragmentary cross sections of socket and nozzle showing three possible methods of splitting the triangular ring seal, and an arrangement of pins and retaining springs.

FIG. 4D is a plan view of the insulating and retaining ring reduced in size, arcuately segmented and showing one possible arrangement of springs and retaining pins.

FIGS. 4E and 4F show two possible configurations of the gap between mating segments of the seals.

FIGS. 5A, 5B and 5C are analogous to FIGS. 4A, 4B and 4C, but show a modified arrangement of pins and springs.

FIG. 5D is a plan view of the insulating and retaining ring, springs and pins considering the ring reduced in size and laid horizontally.

FIGS. 5E and 5F are analogous to FIGS. 4E and 4F, but show the retaining ring integral in form.

FIGS. 6A and 6B are cross-sectional views showing split rectangular seals located in rectangular recesses in a fixed socket, and retained on two sides by L-shaped retainers, provided with a retaining spring and retaining pins on the two external sides. FIGS. 6A and 6B each show a possible method of splitting the rectangular seal and L-shaped retainer.

FIG. 6C shows a view of the retaining ring looking in the direction of the arrow C in FIG. 6A, and showing the ring arcuately segmented.

FIGS. 6D and 6E are cross-sections along the line 6—6 of FIG. 6C and show possible joint designs for the segmented ring and seal.

FIG. 7 is a cross-section of a further modification of a retaining ring (trapezoidal in cross-section) for a split triangular seal. Retaining pins and spring are provided on upstream side of retainer.

FIG. 8 is a fragmentary cross-section of a portion of a fixed socket and a movable nozzle. The seal is a split trapezoidal ring.

FIGS. 8A and 8B show possible configurations of nesting ring segments.

Figure 1:
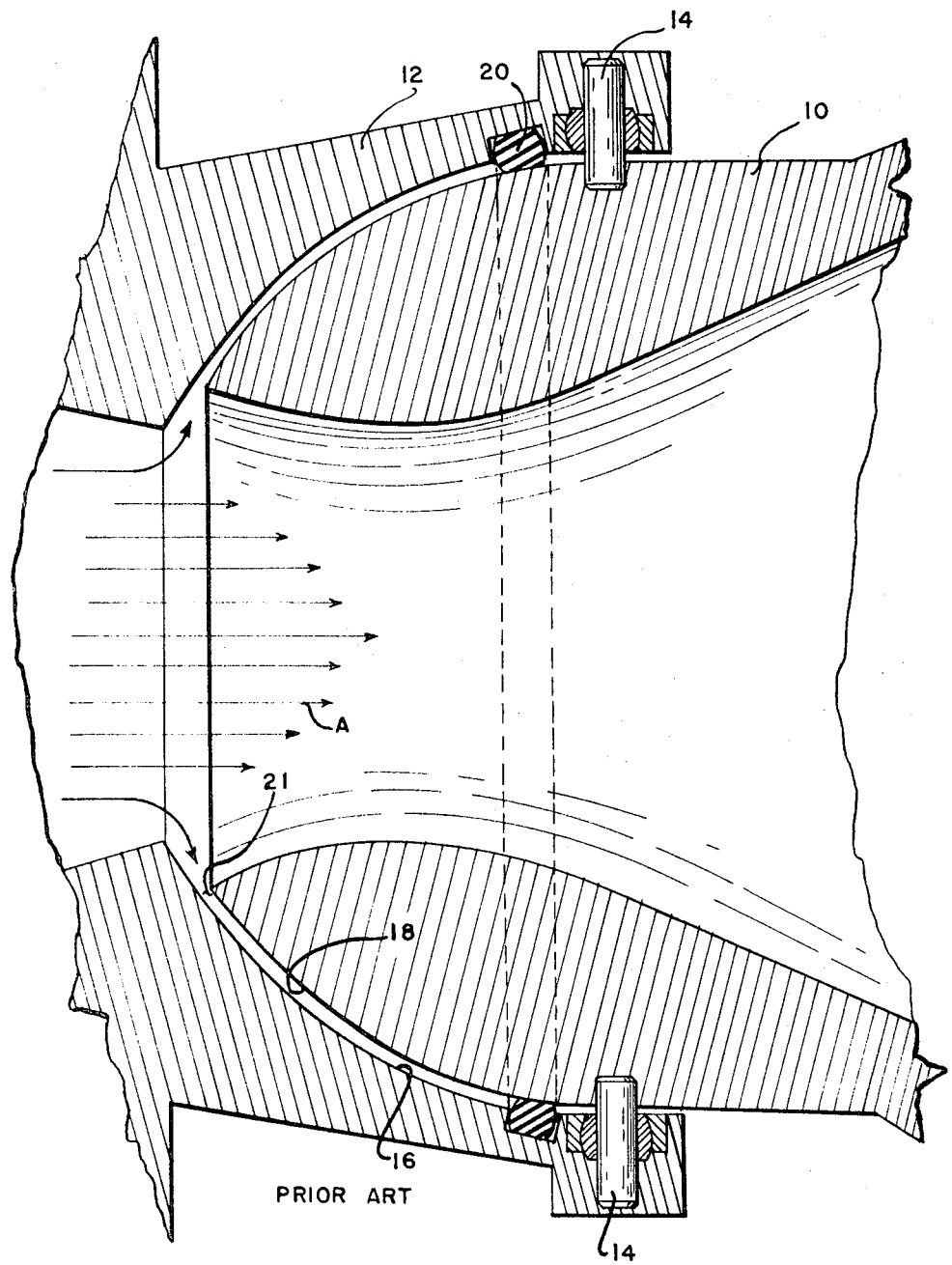
FIG. 1 is a fragmentary cross-sectional of the typical nozzle configuration presently available and is prior art.

Referring more in detail to the drawing, FIG. 1 is a prior art representation of a nozzle subject to metal deposits, friction and failure of elastomeric sealing elements as described above. A ball nozzle 10 is mounted in a fixed socket 12 for swivelling movement about the pivot pin 14. The mating and complementary surfaces of the ball and socket are indicated at 16 and 18, the usual elastomeric seal being shown at 20. The high velocity and high temperature gasses enter the nozzle 10 as shown by arrows A, some of these gasses unavoidably entering the split line gap indicated at 21 between ball and socket surfaces.

Figure 2:
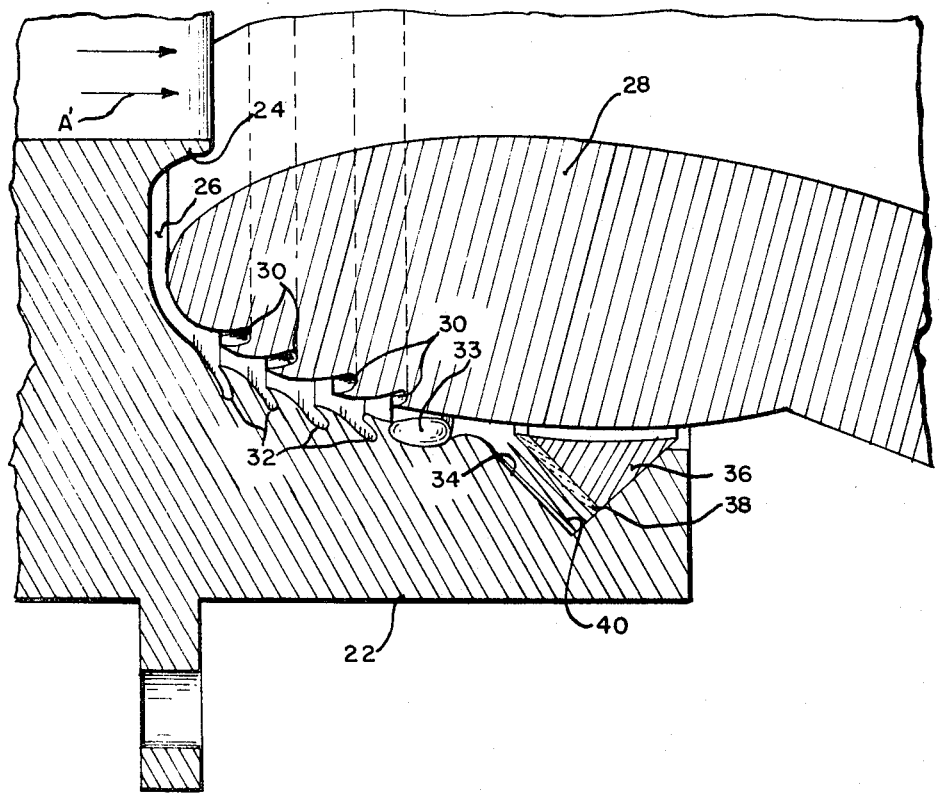
FIG. 2 is a fragmentary cross-section of one form of the device, showing a lubricating system and a single element triangular sealing ring which is spring biased.

FIG. 2 shows one of the improved nozzle configurations which the invention provides. The fixed socket 22 has an overhanging annular lip portion 24 which extends beyond the entrance to the split line gap 26 between socket 22 and nozzle 28. It will be seen that this configuration improves the hot gas flow characteristics, eliminates turbulence, conveys the tungsten molybdenum and similar alloys contained in the gas downstream and into the nozzle throat, leaving the split line gap 26 comparatively clean.

With this configuration the size of the gap 26 may be increased, greatly reducing friction between the expanding socket and nozzle.

Partially reentrant circular grooves 30 are formed in the ball nozzle 28 and grooves 32 also directed upstream are formed in the socket 22. These grooves form pockets which entrain lubricants such as grease or graphite powder. Upon contact with the hot gas and pressure, the lubricant is dispersed from the grooves to lubricate the metal seal later described. The lubricant also operates as a heat sink. The grooves also function to retain lubricant materials for indefinite periods of vertical silo storage of the missile.

The grooves also serve as metal alloy traps. Such alloy as would deposit on the sliding surfaces of socket and nozzle is scraped into the grooves and rendered incapable of causing friction.

The socket surface is also provided with recess which accommodates a bag 33 containing lubricant. The bag 33 is designed to be of such resistance as to burst under predetermined conditions of heat and pressure, thereby providing additional lubrication and serving as a heat sink.

An additional V-shaped groove 34 is formed in the socket 22 to accommodate the spring pressured ring seal 36. The ring 36 is of such material as to resist heat and pressure. Where elastomers have been previously used the present invention uses metal and such synthetics as are of comparable resistance. The ring 36 is triangular in cross-section, and is held in place by a retaining and insulating ring 38 which is conical band fitting along one side of the triangular ring 36. The members 36 and 38 are held in place by a series of springs 40. The number and placement of the springs may be varied. Possible configuration variations and the use of sealing rings of split triangle formation are both described hereinafter.

Figure 3:
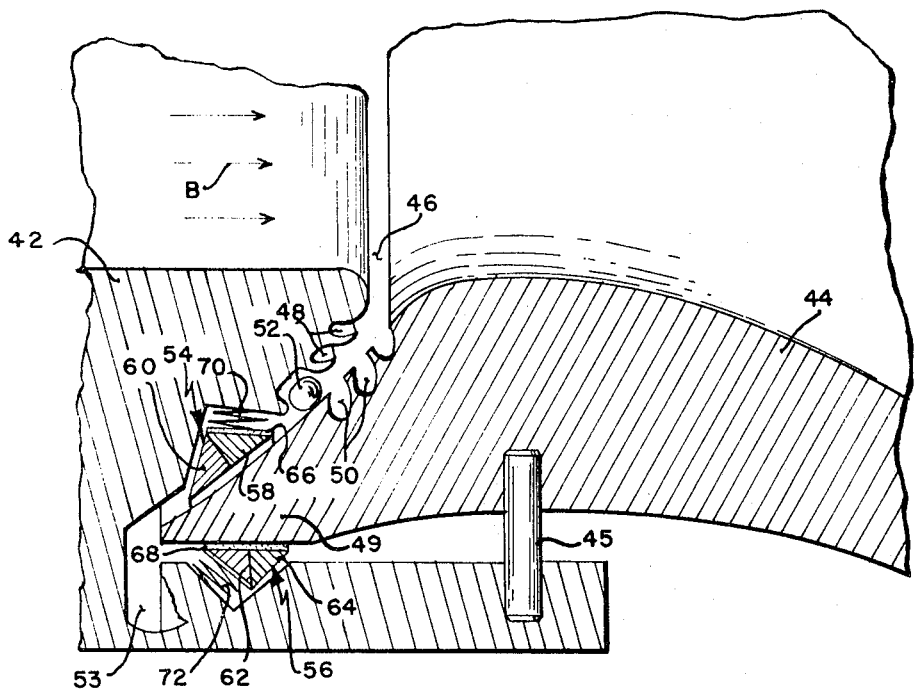
FIG. 3 is a fragmentary cross-section of an alternative socket and nozzle configuration, a lubrication and filter system and two split triangle ring seals.

In FIG. 3 which shows an alternate nozzle configuration, the socket 42 and nozzle 44 pivoted at 45, are of such configuration that the split line gap 46 between them extends forwardly, then undergoes a reverse turn, its initial direction serving dynamically to prevent entrance of hot gasses into the gap 46. This V-line gap is formed by an annular forwardly extending recess formed in the fixed socket 42 which receives an annular lip portion 49 of the nozzle 44. The split line gap 46 is thus given a reverse turn configuration. The facing surfaces of socket 42 and nozzle 44 are provided with grooves 48 and 50, respectively, and the frangible bag 52 containing lubricant as described in connection with FIG. 2. A circumferential trap 53 is provided to contain any harmful substances which escape past the grooves 48 and 50 and the seal 54. The seal 54 located at the inner facing surfaces between socket 42 and lip 49 is protected from such burning gasses as enter the gap 46.

While FIG. 2 shows a socket and nozzle wherein a single metal ring seal 36 of triangular cross-section, the form of the invention of FIG. 3 shows a pair of such seals 54 and 56, located at inner and outer sections of the reverse turn gap.

The cross-section of each seal 54 and 56 is a split triangle, each seal being formed of two (or more) ring-shaped segments, 58, 60, and 62 and 64, respectively. Retaining and insulating rings 66 and 68 and springs 70 and 72 retain the seal segments in operating position in the recesses provided for them.

It will be noted that in all of the embodiments shown, the arrangement of the seal is always such that pressure of the gas flow is in a diretcion to increase the effectiveness of the seal, and that the bias of the springs reinforces this pressure.

Some of the possible forms of split triangles and an arrangement of springs is shown in FIG. 4A and its augmenting figures. FIG. 4A shows the triangular ring 74 divided into two equal segments 76 and 78. FIG. 4B shows a pair of segments 80 and 82 nesting along a curved division line indicated at 84, and FIG. 4C shows a triangular ring 86 divided into two segments 88 and 90 of unequal size and shape. These figures are exemplary only and indicate the variety of divisions that can be made.

To hold the portions of the triangle intact, and to provide insulation and a heat sink, a retaining ring 92 of segmented conical formation fits one triangular side of the seal. Springs 94 and 95 provide also low friction pressure, and retaining pins 96 function as retainers in the event of relaxation of the springs 94 and 95. These springs also function to provide constant space between the fixed socket and the seal, allowing flowing gas pressure to reinforce the seal.

The split sections concept provides a high degree of flexibility during expansion of various sections which occurs during operation. In addition, the split segments have sharp edges acting as scrapers and remove aluminum oxide, tungsten molybdenum and other alloy deposits entrapped in the gap between socket and nozzle and depositing on their surfaces.

In FIGS. 4A, 4B, 4C and all of the ensuing figures of the drawing, the numerals 10' and 12' indicate respectively any configuration of movable nozzle and fixed socket where the seal of the invention is useful.

Many variations of design are possible within the purview of the invention. For example, the conical retaining ring 92, which in FIG. 4 is arcuately segmented (see FIGS. 4D, 4E and 4F) may be an integral conical ring shaped band as shown at 92' in FIGS. 5A, 5B, 5C, 5D and 5E. The number and location of springs may also be varied as special environments dictate.

The triangular seal may be modified as shown in FIGS. 6A and 6B, wherein split rectangular ring seals 94 and 94' are divided by way of example into equal rings or into nesting rings having complementary curved convex and concave surfaces as at 96 in FIG. 6B. In these modifications, the insulation is shown as an L-shaped ring 99 formed to fit the rectangular seals 94 and 94'.

Safety pins 100 are proivded as deemed advisable on the exterior surfaces of the ring 98. They may be provided for one surface, both surfaces, or they may be omitted. Springs 102 are provided as environment dictates. As shown in FIGS. 6A and 6B, the spring 102 functions as the main pressurizing force.

The L-ring is shown arcuately segmented in FIGS. 6C, 6E, 6D but it may also be integral.

A further modification of retainer for a triangular or split triangular ring seal 104 is shown in FIG. 7. A retaining ring 106 is trapezoidal in cross-section, has its irregular side facing and is complementary to, one triangular side of the sealing ring 104. Insulation, retaining spring and safety pins are provided at 108, 110 and 112, respectively, as environment dictates.

FIG. 8 shows a form of seal 114 substantially trapezoidal in cross-section provided with pins 116 but no insulation and no springs.

As will be apparent from the examples of designs given above, a great variety of forms of ring seals and retaining rings are possible. They may or need not be arcuately segmented. (See FIGS. 4D, 5D and 6C) and if segmented, the number of arcurate divisions of each ring may be varied according to tested needs. The seal may or need not be (see FIG. 2) comprised of nested ring shaped segments. The complementary contours of joining segments, both arcuate segments and ring segments, are capable of a great variety of designs of meshing components. The tongue and groove joint and the offset shoulder shown in FIGS. 4E and 4F, 5E and 5F, 6D and 6E and 8A are shown as examples of the great variety of contours of joining surfaces that are possible between segments.

I claim:

1. In high temperature high pressure nozzle equipment a stationary socket, a nozzle mounted for swivel motion in said socket, facing complementary surfaces on said nozzle and said socket, deterring means for deterring penetration of gases into the gap between said ball and said socket, trapping means for trapping molten metal material entering said gap, and lubricating means to lubricate said ball and said socket said lubricating means being rendered operable by the high temperature conditions of operation of the nozzle.

2. A device as set forth in claim 1, wherein said deterring means comprises an annular portion integral with said socket and formed as an overhang for protecting the entrance to said gap.

3. A device as set forth in claim 1, wherein said trapping means comprises a series of annular pockets in the complementary and facing surfaces of said ball and said socket for containing lubricants and for trapping molten metal particles.

4. A device as set forth in claim 1, wherein said lubricating means comprises a bag containing lubricant material located in a recess on a surface of said socket, said bag constructed to burst under conditions of operation and liberate the lubricant material contained therein.

5. A device as set forth in claim 1, wherein the facing complementary surfaces on said socket and said nozzle are of complementary V-formation, the gap formed therebetween having two sections in reverse turn, an annular sealing device located in each of said gap sections, each of said sealing devices comprising metal segments, pressured by the gas pressure in said gap to augment the sealing capacity of said sealing devices, and retaining means for each sealing device for retaining said device in sealing position.

6. A spring biased sealing means for sealing a gap between fixed socket and movable nozzle in high temperature, high pressure exhaust devices, said sealing means comprising a metal ring seal pressured for augmented sealing action by exhaust gases entering said gap wherein said metal sealing ring is triangular in cross section, an insulating, and retaining ring located on an outward side of said triangular retaining ring, spring means augmenting the exhaust gas pressure for retaining said insulating ring in a cavity in said socket and pins located on the outwardly directed side of said retaining ring for retaining said ring segments in place in the event of relaxation of said spring.

7. A sealing means for sealing the gap between socket and nozzle in high temperature, high pressure exhaust devices, said sealing means comprising a metal ring comprised of a plurality of ring-shaped segments, said ring-shaped segments being radially segmented to form a plurality of arcuate segments, the arcuate segments being joined by offset complementary and nesting shoulders.

8. A spring biased sealing means for sealing a gap between fixed socket and movable nozzle in high temperature, high pressure exhaust devices, said sealing means comprising a metal ring seal pressured for augmented sealing action by exhaust gases entering said gap, said metal ring seal being rectangular in cross-section, and an insulating and retaining ring, L-shaped in cross-section for fitting the exteriorly directed sides of said metal ring seal.

References Cited

UNITED STATES PATENTS

| 1,651,522 | 12/1927 | Gold | 285—267 |
| 1,802,176 | 4/1931 | Knight | 285—267 |
| 2,717,166 | 9/1955 | Hedden | 285—375 X |
| 3,285,520 | 11/1966 | Johnson | 239—265.35 |

STANLEY H. TOLLBERG, *Primary Examiner.*

U.S. Cl. X.R.

285—267